United States Patent Office 2,874,100
Patented Feb. 17, 1959

2,874,100

STABILIZATION OF UNSATURATED ALDEHYDES

Irwin L. Breier and Galvin M. Coppinger, Oakland, Calif., assignors to Shell Development Company, New York, N. Y., a corporation of Delaware No Drawing. Application December 31, 1956
Serial No. 631,453

10 Claims. (Cl. 202—57)

This invention relates to the stabilization of unsaturated aliphatic aldehydes and relates more particularly to the stabilization of alpha,beta-unsaturated aliphatic aldehydes.

The unsaturated aliphatic aldehydes, such as for example the alpha,beta-unsaturated aliphatic aldehydes readily undergo autopolymerization with the formation of products of a gummy or resinous character. The rate at which such high-boiling materials are formed is often of such magnitude that serious problems result in the transportation, storage, and/or processing of these aldehydic compounds. The presence of the products of autopolymerization not only results in a depreciation of the value of the material contaminated therewith but represents a material loss of valuable unsaturated aldehydes. At least a substantial part of the resinous materials thus formed are generally insoluble in the aldehydes from which they are derived as well as in solvents, such as hydrocarbon solvents, often employed in the processing of the unsaturated aldehydes. Since such insoluble polymeric products separate out of aldehydic materials containing them, the plugging of lines, heat exchangers, distillation apparatus, storage vessels, and the like, wherein the unsaturated aldehydes are found, often quickly follows.

The exceedingly rapid increase in rate of autopolymerization with increase in temperature for many of the unsaturated aldehydes renders difficult, and at times impossible, their processing without recourse to special precautionary measures. Such precautionary measures comprise the use of additives, the use of special and often costly modifications of processing conditions, etc. In the processing of crude unsaturated aldehydes such as the alpha,beta-unsaturated aldehydes, use has been made of certain antioxidants, for example, those of a phenolic nature. However, even these generally prove inadequate to overcome the severe difficulties attributable to insoluble polymeric by-product formation. In bringing alpha,beta-unsaturated aldehydes, for example acrolein, to temperatures encountered in operations such as simple distillation and the like, a degree of insoluble polymer deposition in the equipment often results militating against satisfactory operation of the process even in the presence of antioxidants of the phenolic type. More costly type of operating conditions involving, for example, the use of substantially reduced pressures, refrigeration of process streams, etc., have therefore generally additionally been resorted to heretofore.

In co-pending U. S. application Serial Number 630,056, filed December 24, 1956, it is disclosed and claimed that substantially improved inhibition of autopolymerization of the unsaturated aldehydes is attained by the use of nitric oxide (NO) as stabilizing agent. The use of a normally gaseous material is, however, not always possible or equally desirable under every condition encountered in the transportation, storage, and/or processing of the unsaturated aldehydes.

It has now been found that substantial improvement in the stabilization of unsaturated aliphatic aldehydes, comprising, for example, the alpha,beta-unsaturated aliphatic aldehydes, during transportation, storage, and/or processing thereof at normal or elevated conditions of temperature, is attained by effecting said transportation, storage, and/or processing of said aldehydes in the presence of an amino acid chelating agent represented by the formula

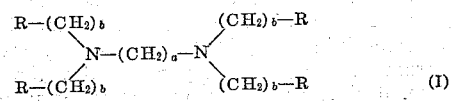

wherein each R is the same or a different member of the group consisting of COOH, CH$_2$OH and COOM wherein M is an alkali metal or NH$_4$, "$a$" is a small whole number at least 2, and "$b$" is a small number at least 1. Preferred alkali metals are sodium and potassium. These suitable agents comprise the alkali salts of alkylene diamine polyaliphatic saturated mono basic carboxylic acids, and more particularly the alkali salts of alkylene diamine tetra aliphatic saturated mono basic carboxylic acids having the following structural formula:

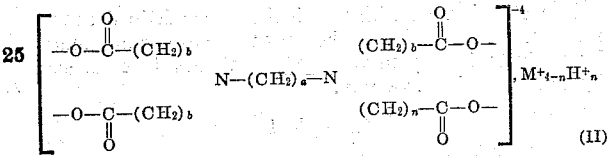

wherein M represents an alkali metal or NH$_4$, which resembles an alkali metal, $n$ is zero or a small whole number not greater than 2, "$a$" is a small whole number at least 2, and "$b$" is a small whole number at least 1.

Preferred agents for the purpose of the invention are the ethylene diamine tetraacetic acid type chelating agents represented by: ethylenediaminetetraacetic acid; di-hydroxyethyl-ethylenediaminediacetic acid; tri-hydroxyethyl-ethylenediamineacetic acid; and the alkali metal salts thereof, particularly the sodium salts such as the mono-, di-, tri-, and tetra-sodium salts of ethylenediaminetetraacetic acid, mono-, di-, and tri-sodium salts of N-hydroxyethylethylenediamine-triacetic acid, etc., as well as mixtures comprising one or more of the foregoing.

Members of the foregoing suitable agents comprise those sold in the industry under the trade names Versenes, Versonols and Versenates by Versenes Incorporated.

The invention is applied broadly to the stabilization during storage, transportation, and/or processing, at ordinary and/or elevated temperatures, of the unsaturated aliphatic aldehydes. It is applied with advantage to the stabilization of the alpha,beta-unsaturated aliphatic aldehydes such as, for example, acrolein, methacrolein, etc., regardless of their source or origin. Comprised within the alpha,beta-unsaturated aliphatic aldehydes thus stabilized within the scope of the invention are the homologs of acrolein comprising those wherein at least one of the hydrogen atoms attached to the alpha or beta carbon atom of acrolein is replaced by an alkyl group such as, for example, methyl, ethyl, propyl, butyl, amyl, etc. The invention is of particular value in the stabilization of the crude aliphatic aldehydes, such as obtained, for example, by controlled catalytic incomplete oxidation of corresponding olefinic hydrocarbons. Comprised within the scope of the invention is the stabilization of the aldehydes in the form of aqueous solutions. Such aqueous aldehyde solutions include the crude aldehydes obtained, for example, by the absorption of part or all of olefin oxidation products comprising the unsaturated aldehydes with aqueous solvents.

Processing steps conducted at elevated temperatures during the course of which the aliphatic aldehydes are stabilized in accordance with the invention comprise any of the steps to which the aldehydes are normally subjected during the processing or treating thereof. Such processing steps may comprise one or more such steps, as for example, distillation, solvent extraction, extractive distillation, heat exchange, condensation, heating, stratification, etc.

The invention is not limited to any specific method of introducing the chelating agent into the aliphatic unsaturated aldehyde to be stabilized. Thus, the agent, as such or in the form of a suitable solution, for example, an aqueous solution, may be added to the aldehyde while the latter is in the liquid phase at ordinary or elevated temperatures. The agent may be added to the aldehyde before, during, or after a processing or treating thereof. The agent introduced into the equipment or vessels wherein the aliphatic aldehyde to be stabilized is contained may be injected into one or more parts thereof. In a preferred method of incorporating the stabilizer into an unsaturated aldehyde, such as, for example, acrolein, it is introduced prior to formation of precursors of the autopolymerization resinous products. This is generally accomplished by adding the stabilizer to the crude aldehyde or by introducing it into the equipment wherein such crude aldehyde is to be processed or treated.

The effectiveness with which the above-defined agents suppress the formation of the very troublesome polymeric by-products in the unsaturated aldehydes is evidenced by the following example:

*Example I*

In a practical scale acrolein manufacturing operation, propylene is oxidized in the presence of a cuprous oxide catalyst in a reactor. Reactor effluent is passed through a closed coil cooler into a receiving vessel. Representative samples, A, of the crude acrolein in the receiving vessel are taken and stored at a constant temperature of 50° C. in glass containers in the presence of air. It is noted that polymer formation, and separation of polymer from solution, begins after only 10 minutes from the initiation of the storage period. After a period of 18 hours of storage, the samples are seen to be full of a finely-divided polymeric material. Two batches of samples, identified herein as batch B and batch C, of the crude acrolein are again taken from the same receiving vessel when an amino type chelating agent consisting essentially of sodium salts of ethylenediaminetetraacetic acid and hydroxyethylethylenediaminetriacetic acid (Versene Fe-3) is being added to the reactor effluent immediately upon its leaving the reactor, in the form of a 1% aqueous solution. The chelating agent is added in an amount equal to 0.002% by weight, based upon acrolein. Oxidation and product cooling conditions of the operation are otherwise substantially identical to the preceding operation executed without the added sequestering agent. The samples B are stored at constant temperature of 50° C. for 18 hours. At the end of the storage period no detectable amount of polymer is evident. To samples C there is added an additional amount of the chelating agent before storage. The chelating agent additionally added is introduced in an amount equal to 0.2% by weight of the acrolein. No detectable amount of polymer is evident after the 18 hours of storage at 50° C.

The amount of the chelating agent added to the unsaturated aliphatic aldehyde may vary considerably within the scope of the invention. The amount preferably added will be governed to some extent by the degree of stabilization desired, the degree of purity of the aldehyde, conditions such as temperature, nature of surfaces in contact with the material, etc. It has been found that the above-defined agents are effective at exceedingly low concentrations. The presence of the agent in such exceedingly small amounts as, for example, from about 1 to about 100 parts per million are often sufficient to obtain substantial inhibition of the undesired polymer formation. In general the agents will be employed in amounts ranging, for example, from about 0.0001% to about 1% by weight. The presence of the agents in amounts in the range of, for example, from about 0.01 to about 0.5% will generally be found to be satisfactory. Higher or lower amounts of the agents may be employed, however, within the scope of the invention.

Without intent to limit in any wise the scope of the invention by theory advanced herein to set forth more fully the nature of the invention, it is believed that often the substantial degree of polymer formation encountered while processing and/or storing unsaturated aldehydes, particularly the alpha, beta-unsaturated aldehydes, such as acrolein, is attributable to at least a substantial degree to the presence therein of the combination of peroxide-oxygen and metal ions, such as iron, copper, etc. Combinations of such impurities are generally unavoidably introduced into the aldehyde as a consequence of the conditions encountered in the processing, storage, and the like, of the material. The presence of these combinations, even in only exceedingly small amounts, often suffices to result in initiating and furthering the undesired polymer formation.

*Example II*

Acrolein in a high state of purity, containing no detectable amount of metal ions, is combined with metal ion-free distilled water to result in an aqueous 5% acrolein. This high purity batch of aqueous acrolein is referred to herein as acrolein-X. A plurality of samples are taken from the acrolein-X and placed in glass containers. Four of the samples are stored at room temperature for 18 hours. To one nothing is added; to a second there is added about 30 parts per million of $H_2O_2$; to a third there is added 10 parts per million of $Fe_2(SO_4)_3$; and to a fourth 150 parts per million of $Cu(C_2H_3O_2)_2$. No detectable amount of polymer is apparent in any of the four samples by visual inspection after storage of 18 hours at room temperature.

In a separate operation 30 parts per million of $H_2O_2$ and 10 parts per million of $Fe_2(SO_4)_3$ are added to a sample of the acrolein-X before storage. Polymer formation is seen to be immediate. To still another sample of the acrolein-X there are added 20 parts per million of $Cu(C_2H_3O_2)_2$ and 150 parts per million of $H_2O_2$ before storage at room temperature. Formation of a polymeric material is seen to commence within 5 minutes from the start of the storage period.

The efficiency with which the formation of the polymeric material is suppressed in the presence of such combination of impurities by the use of the above-defined agents in accordance with the invention is evidenced by the following example:

*Example III*

To a sample of the high purity acrolein-X prepared as described in the foregoing Example II, there are added 10 parts per million of $Fe_2(SO_4)_3$, 150 parts per million of $H_2O_2$ and 0.2% by weight, based on the acrolein, of Versene Fe-3 [1]. No detectable amount of polymer formation is apparent after 18 hours of storage at room temperature.

To another of the samples of the high purity acrolein-X there are added 10 parts per million of $Cu(C_2H_3O_2)_2$, 150 parts per million of $H_2O_2$ and 0.2% by weight of Versene Fe-3. No polymer formation is apparent in the sample after 18 hours of storage at room temperature.

For the purpose of comparison there are added to an-

---

[1] (Versene Fe-3 is an ethylene diamine tetraacetic acid type chelating agent comprising sodium salt of ethylene diamine tetraacetic acid and of hydroxyethylethylene-diamine triacetic acid.)

other of the samples of the high purity acrolein-X, 10 parts per million of $Fe_2(SO_4)_3$, 60 parts per million of $H_2O_2$ and 0.1% by weight of hydroquinone. Formation of polymer becomes apparent after only 30 minutes of storage at room temperature.

Comprised within the scope of the invention is the use of the chelating agents defined above in combination with antioxidants such as, for example, those of phenolic type, such as hydroquinone, 2,4-di-tert-butyl-6-methylphenol, etc. A preferred combination of agents employed within the scope of the invention is the combination of the above defined chelating agents with nitric oxide. The ability of NO to effect the suppression of polymer formation in vapor spaces and relatively inaccessible parts of equipment in general renders the combination of particular advantage when processing or treating the unsaturated aldehydes. The amount of nitric oxide employed in combination with the chelating agent may vary considerably within the scope of the invention. In general the addition of nitric oxide in an amount ranging, for example, from about 0.001 to about 1% by weight based upon the acrolein in the system is satisfactory. Higher or lower amounts of the nitric oxide may be employed, however, in combination with the above defined chelating agents. The presence of the chelating agents in combination with nitric oxide generally enables the use of substantially more severe processing conditions than possible heretofore, and brings within the realm of practicability the distillation of the alpha, beta-unsaturated aldehydes, such as acrolein, without need to resort to such expedients as reduced pressures, refrigeration of reflux streams, etc., as evidenced by the following example:

*Example IV*

Aqueous crude acrolein, containing 3.9% by weight of acrolein, obtained by the controlled catalytic oxidation of propylene and the absorption of reaction products in water, is subjected to practical scale simple distillation in distillation equipment including a packed distillation column maintained under a pressure slightly above atmospheric pressure. The distillation charge is preheated to 40° C. Hydroquinone in the amount of 47 parts per million based on total feed is added to the crude acrolein charge to the distillation. Rate of polymer deposition is such that clogging of preheater and distillation column necessitated termination of the run after a period of operation of 4 days.

The operation is repeated in clean equipment under substantially identical conditions but with the exception that Versene Fe-3 in an amount equal ot 20 parts per million and nitric oxide in the amount equal to 400 parts per million, based upon the acrolein content of the feed to the distillation, is added continuously to the crude acrolein before the preheater of the distillation equipment. After a period of 5.5 days of continuous uninterrupted operation the process is shut down. Examination of the equipment reveals no detectable amount of polymer deposition in preheater, column, or other parts of the distillation equipment.

We claim as our invention:

1. The method of improving the stability of alpha, beta-unsaturated aliphatic aldehydes selected from the group consisting of acrolein and methacrolein during transportation, storage or processing thereof which comprises effecting said transportation, storage or processing of said aldehydes in the presence of an amino acid chelating agent represented by the formula

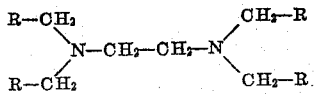

wherein R is selected from the group consisting of COOH, $CH_2OH$ and COOM, wherein M is selected from the alkali metals and $NH_4$.

2. The process in accordance with claim 1 wherein said chelating agent consists essentially of a sodium salt of ethylene-diamine-tetraacetic acid.

3. The process in accordance with claim 1 wherein said chelating agent consists essentially of a mixture of sodium salts of ethylenediaminetetraacetic acid and hydroxyethyl-ethylenediamine-triacetic acid.

4. The process in accordance with claim 1 wherein said aldehyde is acrolein.

5. The process in accordance with claim 4 wherein said chelating agent is present in an amount equal to from about 0.0001 to about 1% by weight.

6. The method of stabilizing alpha,beta-unsaturated aliphatic aldehydes selected from the group consisting of acrolein and methacrolein during the distillation thereof which comprises effecting said distillation of said aldehydes in the presence of an amino acid chelating agent having the general formula

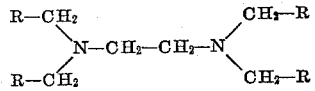

wherein R is selected from the group consisting of COOH, $CH_2OH$ and COOM, wherein M is selected from the alkali metals and $NH_4$.

7. The method in accordance with claim 6 wherein said chelating agent is present in an amount in the range of from about 0.0001 to about 1% by weight.

8. The method of stabilizing aqueous acrolein during the distillation thereof which comprises effecting said distillation in the presence of nitric oxide and an amino acid chelating agent represented by the formula

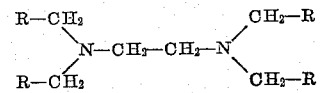

wherein R is selected from the group consisting of COOH, $CH_2OH$ and COOM, wherein M is selected from the alkali metals and $NH_4$.

9. The method in accordance with claim 8 wherein said nitric oxide is present in an amount equal to from about 0.01 to about 1% by weight and said chelating agent is present in an amount equal to from about 0.0001 to about 1% by weight.

10. The method in accordance with claim 8 wherein said chelating agent comprises a sodium salt of ethylenediaminetetraacetic acid.

References Cited in the file of this patent

UNITED STATES PATENTS

| 2,212,894 | Allen | Aug. 27, 1940 |
| 2,700,612 | Chenicek | Jan. 25, 1955 |

OTHER REFERENCES

Burnham et al.: J. Am. Chem. Soc. 62, 453 (1940).
Briner et al.: Helv. Chim. Acta 23 (1940), pp. 542–548.
Calvert et al.: Jour. Chem. Physics 19 (1951), pp. 176–182.
Martell et al.: Chemistry of the Metal Chelate Compounds, 2nd print (1953), p. 511.